United States Patent
Kathan

[19]
[11] Patent Number: 6,112,592
[45] Date of Patent: Sep. 5, 2000

[54] SENSOR HOUSING WITH PROCESS TERMINAL

[75] Inventor: Benno Kathan, Wasserburg, Germany

[73] Assignee: i f m electronic GmbH, Essen, Germany

[21] Appl. No.: 09/147,664

[22] PCT Filed: Jun. 10, 1998

[86] PCT No.: PCT/EP98/03532

§ 371 Date: Feb. 9, 1999

§ 102(e) Date: Feb. 9, 1999

[87] PCT Pub. No.: WO98/57136

PCT Pub. Date: Dec. 17, 1998

[30] Foreign Application Priority Data

Jun. 10, 1997 [DE] Germany ............ 197 24 309

[51] Int. Cl.[7] .................................................. G01D 11/24
[52] U.S. Cl. ................................................................ 73/431
[58] Field of Search ............................................... 73/431

[56] References Cited

U.S. PATENT DOCUMENTS

| | | | |
|---|---|---|---|
| 4,643,026 | 2/1987 | Betterton et al. | 73/431 |
| 5,440,455 | 8/1995 | Rottman | 361/809 |

FOREIGN PATENT DOCUMENTS

| | | |
|---|---|---|
| 0 661 075 | 7/1995 | European Pat. Off. . |
| 0 691 533 | 1/1996 | European Pat. Off. . |
| 36 00 694 | 7/1987 | Germany . |
| 39 33 689 | 4/1991 | Germany . |
| 42 33 315 | 4/1994 | Germany . |
| 43 40 177 | 6/1995 | Germany . |
| 195 24 146 | 1/1997 | Germany . |
| 196 16 658 | 9/1997 | Germany . |

OTHER PUBLICATIONS

Abstracts of DE 36000694 A dated Jul. 16, 1987 inventor R.D. Weber by EPO & Derwent.

*Primary Examiner*—Thomas P. Noland
*Attorney, Agent, or Firm*—Nixon Peabody LLP; David S. Safran

[57] ABSTRACT

A two-part housing (1) for pressure sensors, with a bottom part (2) as the process connection and a top part (3) as the component receiver which contains at one-half of the electrical and electron components. Joining of the bottom part (2) and the top part (3) of the described housing (1) is especially simple and reliable in that the bottom part (2) and the top part (3) are connected to one another by an elastic press fit and in the area of the press fit there are straight surfaces (6) and curved surfaces (7).

17 Claims, 4 Drawing Sheets

SENSOR HOUSING WITH PROCESS TERMINAL

BACKGROUND OF THE INVENTION

Field of the Invention

The invention relates to a two-part or multipart housing for sensors, especially pressure and flow sensors, with a bottom part as the process connection and a top part as the component receiver which therefore contains most or all of the electrical and electronic components.

Sensors which are used to monitor a medium or the property of a medium, for example, the pressure of a liquid or a gas, consist generally of at least two parts, the bottom part being connected to a container or pipe which carries the medium, and therefore often also being called the process connection. These sensors are mainly pressure or flow sensors, but can also, for example, be capacitive fill level sensors. In these sensors, the housing is used, on the one hand, like all sensors, to protect the sensor and the associated electronics, but on the other, also for reliable and permanent connection to the medium-carrying pipe or container.

The advantage of a sensor with a two-part or multipart housing is that, when there is a defect of the sensor or electronics, only the upper part of the housing, need be replaced without the need to intervene in the running process by replacing the process connection. But in these housings, one problem is the connection between the bottom part which is used as the process connection and the top part which contains the bulk of the electronics and which often has a plug or cable connection for this purpose.

In the known housing of the initially mentioned type, the process connection consists of nickel-plated brass. It is produced by turning from standardized hexagonal solid material, part of the original hexagonal surface being maintained as a key surface. For connection to the measurement medium it has an inside or an outside thread. The bottom part of the housing is connected to the top part by a press fit, knurling being formed on the top end of the bottom part. The wall thickness of the top part which is made as a pipe section, for cost reasons generally as a welded pipe section, decreases gradually in the direction to the knurling.

The disadvantage in this known housing is that by pressing the top part onto the bottom part the protective nickel layer is partially damaged in the area of the knurling and the underlying brass is not very resistant chemically. This is especially disadvantageous when the measurement medium is chemically corrosive. Another major disadvantage is that with regard to the inside diameter of the top part and the outside diameter of the bottom part in the area of the press fit only very small tolerances are allowable. The forces to be expended for the press fit and the loading capacity of the connection depend largely on these tolerances. Since the wall thickness of the top of the press fit is very low, cracks or deformations of the top part can occur.

Housings of the above described type are also known in which the top part and the bottom part of the housing are welded or screwed to one another. If the top part and the bottom part are welded together, of course the electronics can no longer be replaced without intervening in the process. Since the electrical connection, which is often a plug-and-socket connection, is very short between the top part and the bottom part, due to improper screwing and overly large tolerances of the threads a displacement of the top part relative to the bottom part can occur which can no longer ensure reliable operation of the sensor.

SUMMARY OF THE INVENTION

The object of the invention is to make available a housing in which the connection between the top and bottom part can be effected easily, but also reliably.

The aforementioned object is achieved in accordance with the invention by the bottom part and the top part being connected to one another by an elastic press fit, and in the area of the press fit, there being straight surfaces and curved surfaces. By means of the elastic press fit and the different surfaces, the tolerances of the inside diameter and the outside diameter of the top and bottom part need not be made especially narrow; this leads to economical production. For the same tolerances as in the prior art, the probability of damage to the top and bottom part is clearly reduced.

The straight and curved surfaces are located preferably in the top area of the bottom part and there they form a press fit surface. When the top part and the bottom part are joined, the top part in the area of the curved surfaces then adjoins the bottom part, while in the area of the straight surfaces it adjoins the bottom part only slightly or not at all, so that a free space is formed between the top part and the bottom part. The top part can thus deform in the direction of the straight surfaces without cracks forming.

According to one advantageous embodiment of the invention, on the bottom part underneath the press fit surface there is a groove for holding an O-ring. This O-ring is used for additional sealing of the housing so that neither liquid nor dirt can enter the housing at the connecting point between the top part and bottom part.

To further facilitate joining of the top part and bottom part of the housing, in the housing in accordance with the invention the top edge of the bottom part can be made as an insertion cone above the press fit surface. Joining of the top part and bottom part can be further facilitated by the wall thickness of the top part decreasing in the press fit area. In doing so the decrease of the wall thickness can take place both incrementally or also continuously in the direction to the lower part.

To facilitate attachment of the bottom part to a process line or a tank, part of the bottom part is made, for example, as a hexagonal key surface. This key surface can advantageously contain a graduation which is used as the support surface for the lower edge of the top part.

If the bottom part is produced by turning from standardized hexagonal solid material, advantageously one part of the original hexagonal surface can be used as the key surface. In addition, part of the original hexagonal surface can be taken over as straight surfaces of the press fit surface. But of course, the key width of the straight surface can also deviate from the key width of the key surface. Likewise, instead of the solid hexagonal material a square bar material with a quadratic cross section or some other bar material with a regular polygonal cross section can be used.

The top part which is advantageously produced from a welded sleeve can have both a constant outside diameter and also an outside diameter which widens to the top. Advantageously, the top part also has a hole for a plug connection.

For very small wall thicknesses of the top part, for additional fixing in addition to the elastic press fit, there can also be a catch connection between the bottom part and the top part.

Both the top part and also the bottom part of the housing advantageously consist of coated brass, for example, nickel-plated brass, or of uncoated high quality steel, for example, V4A.

In particular there are a host of possibilities for developing the housing in accordance with the invention.

DETAILED DESCRIPTION OF THE INVENTION

Figure 1:
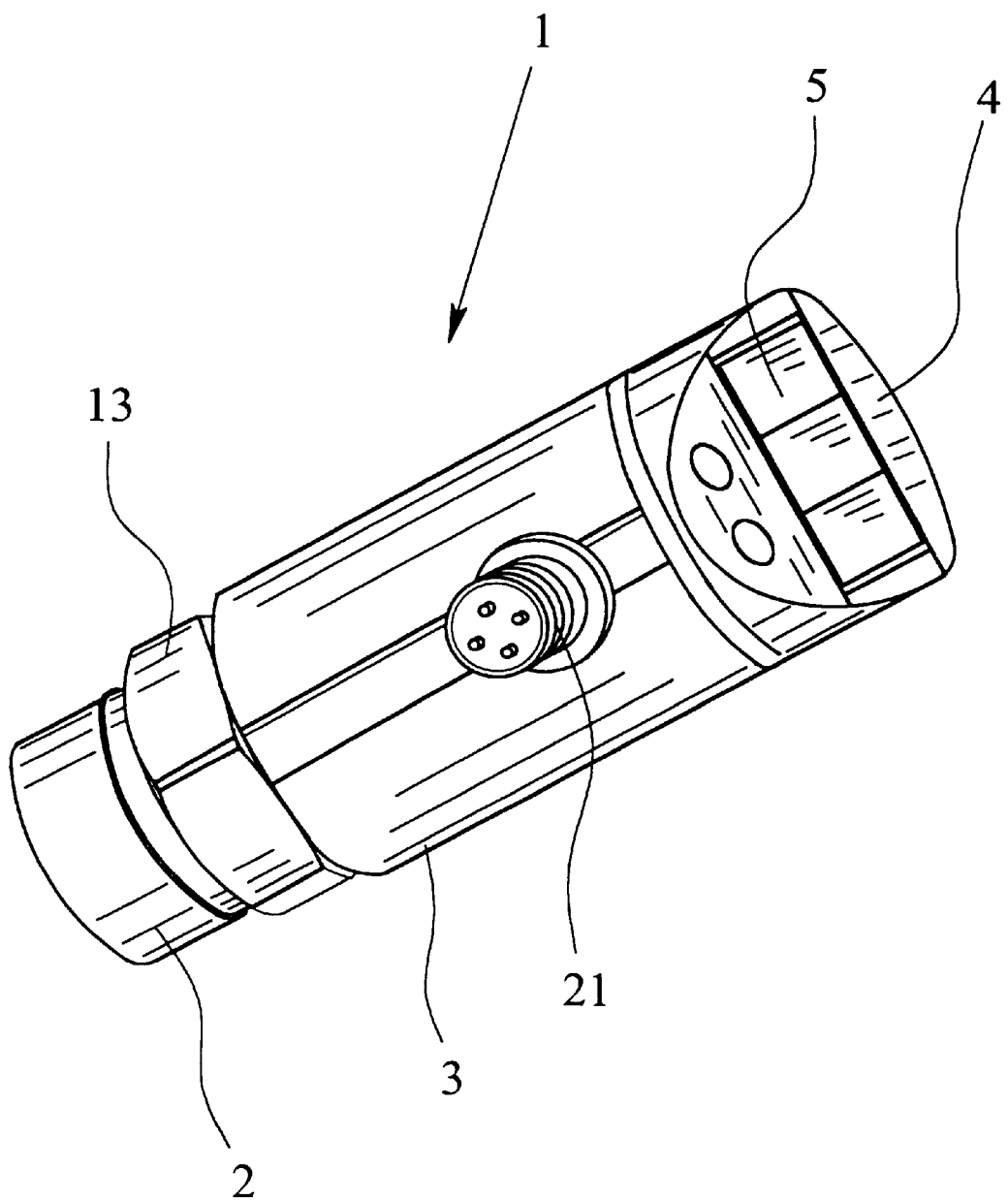
FIG. 1 shows a housing of a sensor with an additional housing head.

FIG. 1 shows a multipart housing 1 consisting of a bottom part 2 and a top part 3. The housing 1 is sealed by a housing head 4 which has a measured value display 5.

Figure 2:
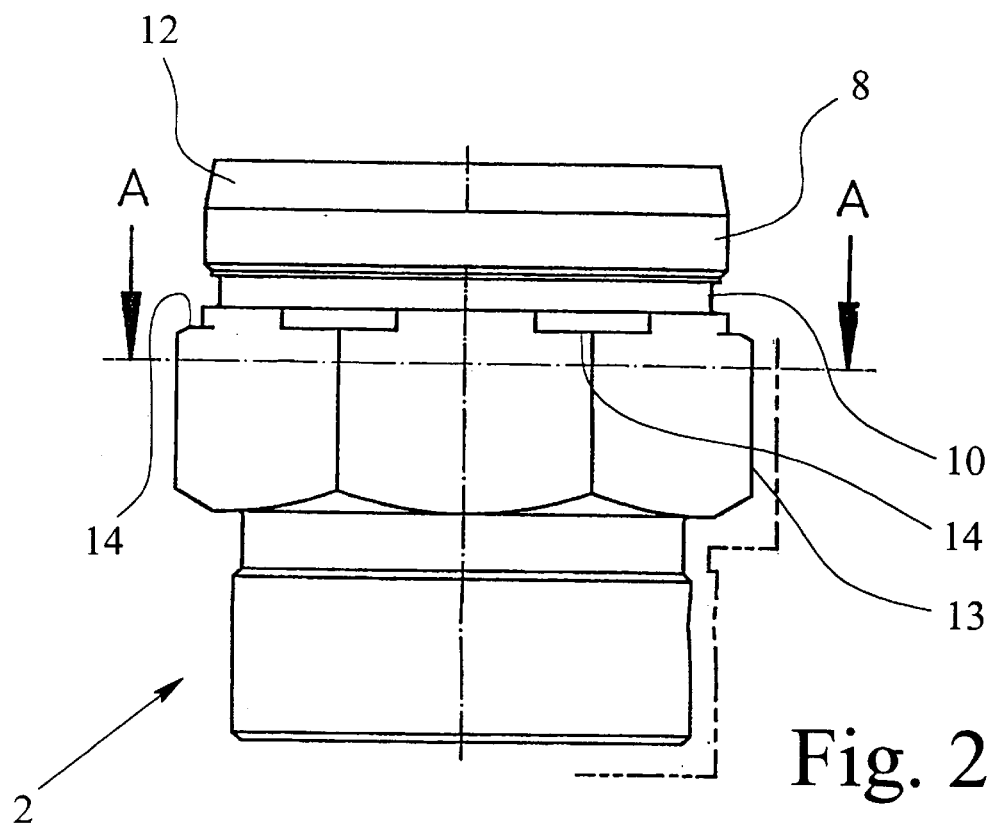
FIG. 2 shows one version of a bottom part of a housing in accordance with the invention in a side view.
Figure 3:
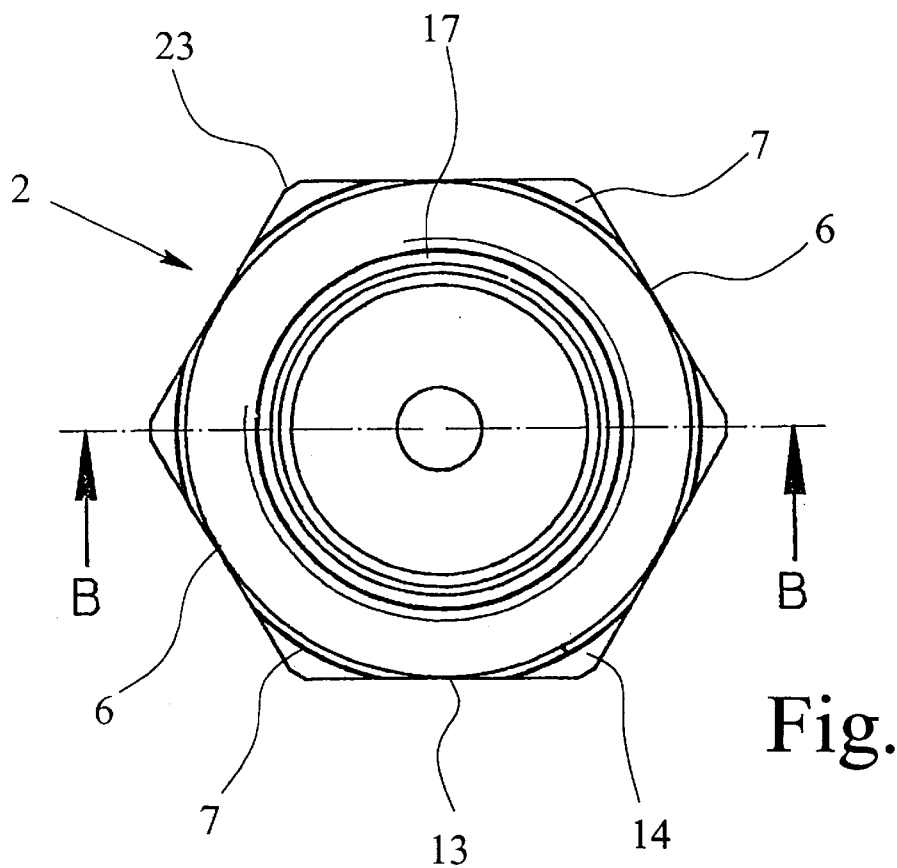
FIG. 3 shows the bottom part as shown in FIG. 2 as a cross section along line A—A in FIG. 2.
Figure 4:
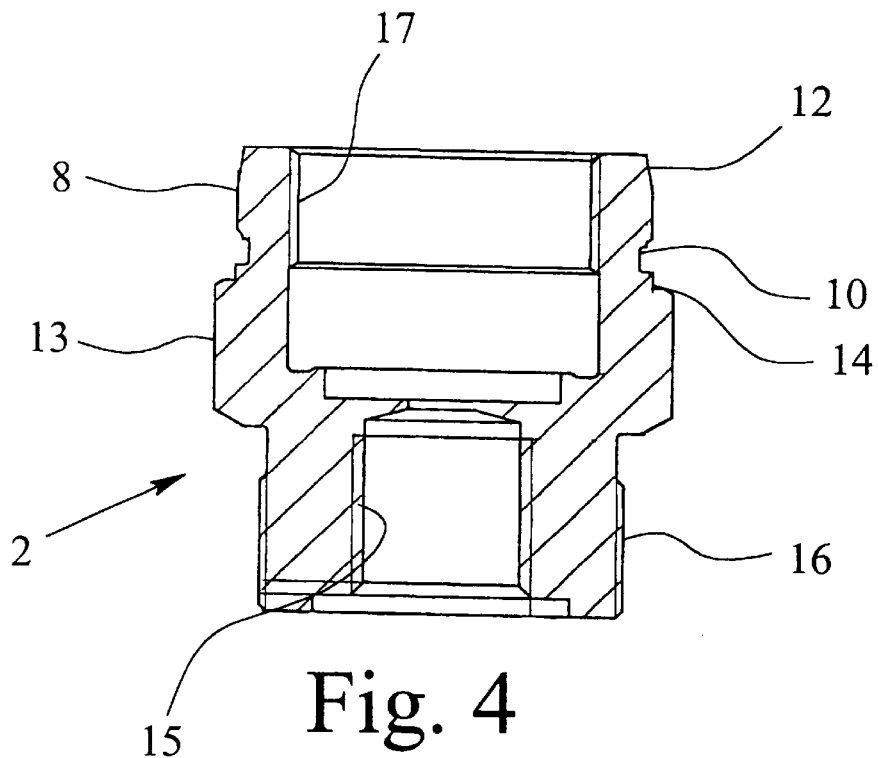
FIG. 4 shows the bottom part as shown in FIGS. 2 and 3 as a longitudinal section along line B—B in FIG. 3.
Figure 6:
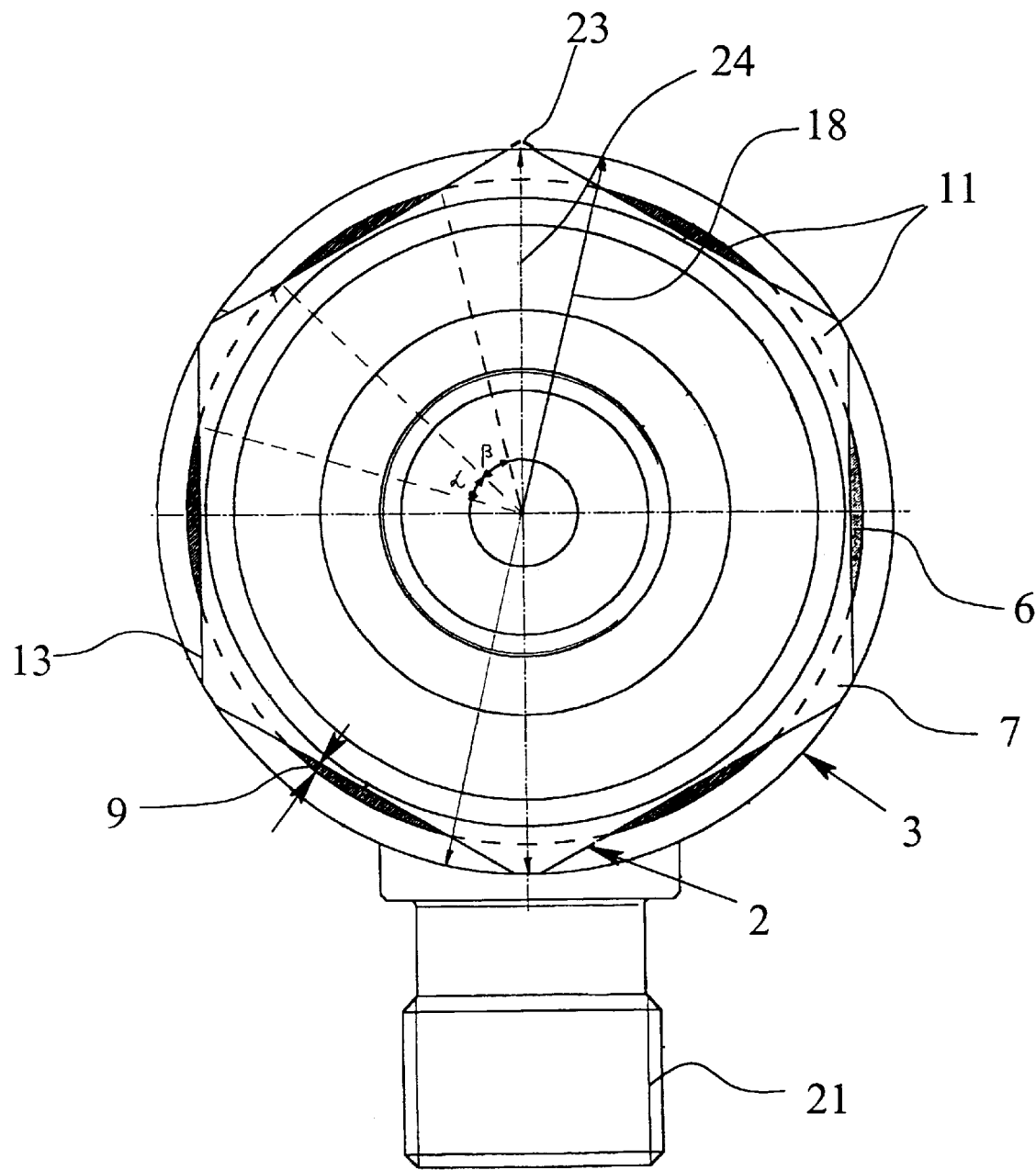

The bottom part 2 which belongs to the housing 1 in accordance with the invention, as FIGS. 3 and 6 show, has straight surfaces 6 and curved surfaces 7 which together form a press fit surface 8 (compare FIGS. 2 and 4). After joining the bottom part 2 and the top part 3, the top parts 3 lies in the area of the curved surfaces 7 on the bottom part 2, while in the area of the straight surfaces 6 there is a free space 9 between the top part 3 and the bottom part 2. Under the press fit surface, in the bottom part 2 there is a groove 10 into which an O-ring 11 fits to seal the bottom part 2 relative to the top part 3. Above the press fit surface 8 is an insertion cone 12 with a diameter which decreases in the direction of the top edge of the bottom part 2. This insertion cone 12 facilitates pressing the top part 3 over the press fit surface 8. Under the groove 10 is a hexagonal key surface 13 with six corners in the upper area each having a graduation 14. The graduations 14 are used as a support surface for the lower edge of the top part 3 which is pressed over the insertion cone 12, the press fit surface 8 and the groove 10, with the O-ring inserted therein. In the housing shown in FIG. 1, the bottom part 2 and the top part 3 are joined so that the lower edge of the top part 3 is directly adjoined by the key surface 13 of the bottom part 2.

FIG. 3 shows the bottom part 2 as shown in FIG. 2, but here in cross section along the line A—A so that the aforementioned straight surfaces 6 and the curved surfaces 7 of the press fit surface 8 become apparent. FIG. 3 also shows that the straight surfaces 6 have the same key width as the key surface 13. The bottom part 2 shown has been produced by turning from standardized solid hexagonal material. Here, both for the straight surfaces 6 and also for the key surface 13, the shape of the original solid hexagonal material has remained unchanged.

Since the bottom part 2 is the process connection of a pressure sensor, the bottom part 2 in the lower area has an inside thread 15 and an outside thread 16, and in the upper part, an inside thread 17. The lower area of the bottom part 2 therefore enables both the bottom part 2 to be screwed into a pipe or a container, in conjunction with a corresponding inside thread of the pipe or tank, and also screwing onto a pipe provided with a corresponding outside thread. The inside thread 17 provided in the upper area of the bottom part 2 is used to hold a support ring which is provided with a corresponding outside thread and which is assigned to a pressure measurement cell.

FIG. 4 shows the bottom part 2 as shown in FIGS. 2 and 3 in a longitudinal section along line B—B in FIG. 3. FIG. 4, like FIG. 2, shows the insertion cone 12 located above the press fit surface 8. The inside thread 17 extends over the height of the insertion cone 12, the press fit surface 8 and the groove 10.

Figure 5:
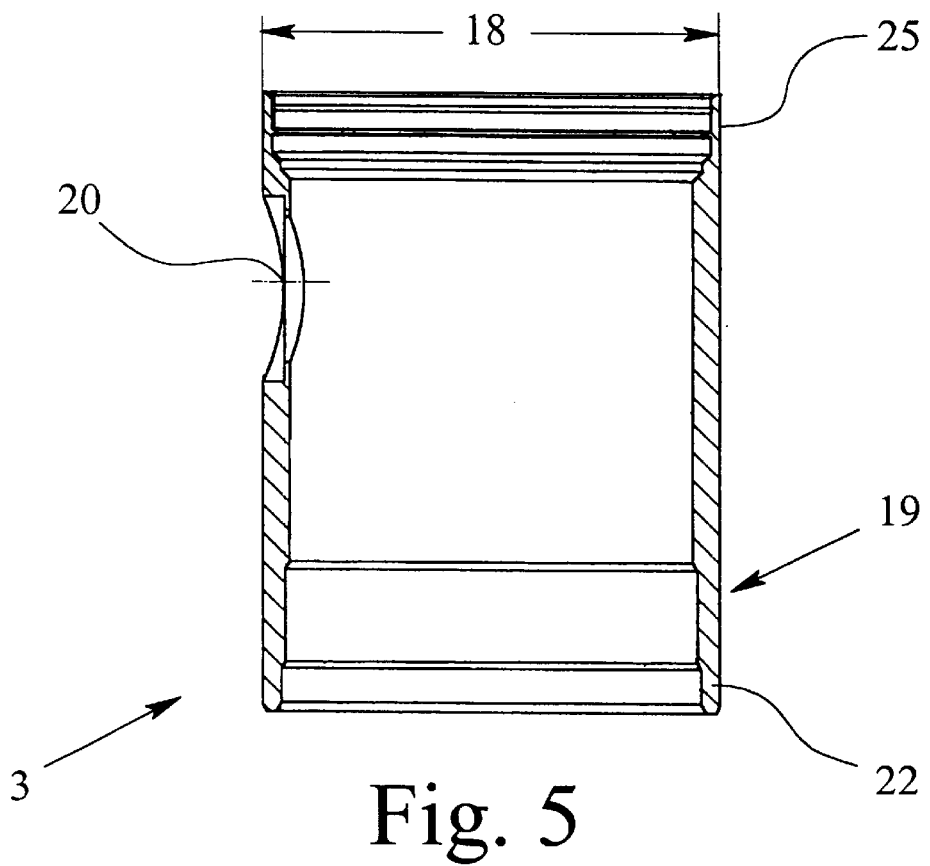
FIG. 5 shows one embodiment of a top part of the housing in accordance with the invention in a longitudinal section and FIG. 6 shows the bottom part as shown in FIGS. 2, 3 and 4 and the top part as shown in FIG. 5 joined as one preferred embodiment of a housing in accordance with the invention with an additional plug-and socket connection.

FIG. 5 shows the top part 3 of a housing 1 in accordance with the invention in a longitudinal section. The top part 3 has the shape of a sleeve with an outside diameter 18 constant over the length. In the lower area of the top part 3 is a press fit area 19 which, upon joining to the bottom part 2, is pressed over the press fit surface 8 of the bottom part 2 and which has a lower edge which sits on the graduations 14 of the bottom part 2. The wall thickness of the press fit area 19 decreases in steps toward the lower edge of the top part 3. The decrease of the wall thickness in the press fit area 19 facilitates pressing the top part 3 onto the bottom part 2. The wall thickness can of course also decrease in some other way, for example, continuously. Likewise, in another version of the top part 3 its outside diameter 18 can change, for example, can widen to the top. On one side of the top part 3, in its upper area, there is a hole 20 which is used to hold a plug connection 21 shown in FIG. 1. In the bottom part of the press fit area 19 of the top part 3, there is an O-ring area 22 which in the joined state of the bottom part 2 and the top part 3 surrounds the groove 10 of the bottom part 2. Thus, then, the O-ring is pressed between the groove 10 of the bottom part 2 and the O-ring area 22 of the top part 3 so that a reliable seal is achieved.

It has been stated above that the bottom part 2 has been produced by turning from standardized solid hexagonal material. Here, the corners 23 which were originally present and which are shown in FIG. 6 have been rounded off. The outside diameter 24 of the key surface 13 corresponds to the outside diameter 18 of the top part 3.

As can be taken from FIG. 5, the part of the top part 3 away from the bottom part 2 is provided with an end area 25 with a wall thickness which is diminished incrementally towards the top. The end area 25 of the top part 3 is used to hold the housing head 4 shown in FIG. 1.

FIG. 6 shows the housing 1 as claimed in the invention, the top part 3 as shown in FIG. 5 being pressed onto the bottom part 2 as shown in FIGS. 2 to 4. FIG. 6 also shows the plug connection 21 which is attached in the hole 20 of the top part 3. FIG. 6 again shows the straight surfaces 6 and the curved surfaces 7 of the bottom part 2, the top part 3 in the area of the curved surfaces 7 of the bottom part 2 adjoining the latter and in the area of the straight surfaces 6 of the bottom part 2 a free space 9 can be recognized between the top part 3 and the bottom part 2. The top part 3 can deform in the direction toward the straight surfaces 6 of the bottom part 2 through the free space 9. The excess amount of compression, i.e., the difference between the outside diameter of the press fit surface 8 and the corresponding inside diameter of the top part 3, in the press fit area 19, is roughly 0.1 mm to 0.3 mm, preferably 0.15 mm to 0.2 mm. FIG. 6 also shows the O-ring 11 which is pressed between the groove 10 of the bottom part 2 and the O-ring area 22 of the top part 3.

Finally, it should be pointed out that, in this embodiment, both the straight surfaces 6 of the bottom part 2 and also its curved surfaces 7 have an angular periphery of roughly 30 degrees.

What is claimed is:

1. A multipart housing for sensors comprising:
   a bottom part as a process connection; and
   a top part as a component receiver which contains at least one half of electrical and electronic components of the sensors;

wherein the bottom part and the top part are connected to one another by an elastic press fit and in an area of the press fit there are straight surfaces and curved surfaces; and wherein a free space is formed between the top part and the bottom part in areas where the curved surfaces and the straight surfaces face each other.

2. A housing as claimed in claim 1, wherein the straight surfaces and the curved surfaces form a press fit surface in an upper area of the bottom part.

3. A housing as claimed in claim 2, wherein a groove is formed on the bottom part underneath the press fit surface for holding an O-ring.

4. A housing as claimed in claim 2, wherein a top edge of the bottom part defines an insertion cone above the press fit surface.

5. A housing as claimed in claim 2, wherein part of the bottom part defines a key surface having a graduation which is used as a support surface for the top part.

6. A housing as claimed in claim 5, wherein the bottom part is produced by turning from standardized hexagonal solid material and part of an original surface of the hexagonal solid material forms the key surface.

7. A housing as claimed in claim 6, wherein the straight surfaces are part of the original surface of the hexagonal solid material.

8. A housing as claimed in claim 7, wherein the straight surfaces have an angular periphery of about 30 degrees.

9. A housing as claimed in claim 5, wherein corners of the key surface are rounded off and an outside diameter of the key surface is equal to an outside diameter of the top part in an area of the corners.

10. A housing as claimed in claim 2, wherein a lower area of the bottom part has at least one of an inside thread and an outside thread and the upper area of the bottom part has an inside thread.

11. A housing as claimed in claim 2, wherein the curved surfaces have a greater angular periphery than the straight surfaces.

12. A housing as claimed in claim 2, wherein the top part has the shape of a sleeve with a constant outside diameter and a wall thickness of the top part decreases in a lower area thereof which defines a press fit area.

13. A housing as claimed in claim 2, wherein the difference between an outside diameter of the press fit surface and a corresponding inside diameter of the top part in the press fit area is roughly 0.1–0.3 mm.

14. A housing as claimed in claim 2, further comprising a catch connection for coupling the bottom part and the top part.

15. A housing as claimed in claim 2, wherein the top part has a hole for a plug connection.

16. A housing as claimed in claim 2, wherein the bottom part and the top part are made of coated brass or uncoated high quality steel.

17. A housing as recited in claim 2, wherein the difference between the outside diameter of the press fit surface and the corresponding inside diameter of the top part in the press fit area is roughly 0.15–0.2 mm.

\* \* \* \* \*